United States Patent Office

2,974,144
Patented Mar. 7, 1961

2,974,144

ALKALOID AND PROCESS FOR ITS PRODUCTION

Murle W. Klohs, Northridge, and Marshall D. Draper and Fred Keller, Los Angeles, Calif., assignors to Riker Laboratories, Inc., Los Angeles, Calif., a corporation of Delaware No Drawing. Filed Apr. 2, 1954, Ser. No. 420,754

17 Claims. (Cl. 260—287)

The present invention relates to the preparation of an active substance in pure form from plants of the Rauwolfia species, especially *Rauwolfia serpentina* Benth, also *Rauwolfia canescens* Linn. or *Rauwolfia vomitoria* Afz.

Various alkaloids have already been isolated from Rauwolfia extracts, such as ajmaline, ajmalicine, ajmalinine, serpentine, serpentinine, reserpine, rauhimbine, isorauhimbine and rauwolffinine. It is also known that preparations with a sedative and hypotensive effect can be made and are valuable for therapeutic purposes. For instance, neutral resin fractions called "Oleoresins," can be obtained; these resin fractions have a sedative effect. Purified alkaloidal preparations can also be made by the method described in co-pending application, Serial No. 3,610,076, filed June 11, 1953, now abadoned.

The sedative activity of these preparations has previously been attributed to the presence in these fractions of a single alkaloid, namely reserpine.

We have discovered that the alkaloid reserpine does not account for all the sedative activity present in the plant. Further, we have now discovered another sedative any hypotensive substance to be present and to be obtainable in purified form by the process of our invention.

Previously in the course of chemical studies of the alkaloid reserpine we had saponified the latter to methyl reserpate and trimethoxy-benzoic acid and then succeeded in esterifying the methyl reserpate with a different acid such as 3,4,5-trimethoxycinnamic acid, as disclosed in our pending application Serial No. 419,093, filed March 26, 1954, now abandoned. This novel ester was found to possess hypotensive action and sedative effect similar to that of reserpine.

Following further study we have discovered that this 3,4,5-trimethoxy-cinnamic ester of methyl reserpate is present in Rauwolfia plants and obtainable in purified form therefrom by the process of our invention. This new ester alkaloid shall hereafter be called rescinnamine.

According to the present invention a pure substance with sedative and hypotensive activity is obtained when the alkaloid melting at about 239° and having the approximate optical rotation $[\alpha]_D^{24} = -97°$ (in chloroform) is isolated from an extract having a sedative effect and obtainable from a plant of the Rauwolfia species with the use of a weakly polar or non-polar solvent only partially miscible with water. From the purified extract containing both reserpine and rescinnamine, the rescinnamine is obtained by fractional crystallization from a non-polar solvent such as benzene, or alternatively by first reducing the reserpine content by fractional crystallization from a polar solvent such as methanol followed by crystallization of the rescinnamine. The new alkaloid can be recrystallized from methanol, methanol-water, acetone-water, benzene, or chloroform-ether.

Rescinnamine is insoluble in water and petrol ether. It is fairly soluble in benzene, methanol, ethanol and 2% phosphoric acid, and readily soluble in acetone, chloroform, 10% aqueous acetic acid and pyridine. Analysis gives the following results: C—66.24%; H—6.62%; N—4.45%; OCH$_3$—28.81%, indicating the empirical formula $C_{35}H_{42}O_9N_2$%; calculated: C—66.23%; H—6.67%; N—4.41%; OCH$_3$—29.34%. By potentiometric titration in 75% dimethyl-formamide-water with 0.01N HCl the molecular weight is 636 and pKa 6.4. On basic hydrolysis with 0.75 N—NaOH in methanol-water rescinnamine yielded 3,4,5-trimethoxy-cinnamic acid and reserpic acid. The 3,4,5-trimethoxycinnamic acid (M.P. 126.5–127° C.) gave no depression of melting point on admixture with an authentic sample. The infra-red spectra and ultraviolet spectra were identical. Analysis and the melting point of the methyl ester confirmed its identity. Reserpic acid, isolated as its hydrochloride, was identified by comparison of its hydrochloride and methyl ester derivatives with authentic samples prepared from reserpine.

The infra-red spectrum (Nujol) of rescinnamine is almost identical with that of reserpine in the shorter wavelengths (2.5–7$\mu$) with the exception of a more intense band at 6.19$\mu$, which may be attributed to the conjugated double bond of 3,4,5-trimethoxycinnamic acid. The ultraviolet spectrum showed $\lambda_{max.}^{alc.}$ (log$^e$): 229$\mu$ (4.73); 302$\mu$ (4.39); $\lambda_{min.}^{alc.}$ (log$^e$): 258$\mu$ (3.88)

The color reaction of the new alkaloid in Fröhde's reagent is from yellow-green to blue.

Rescinnamine is a weak base and forms salts, for example a difficulty soluble sulfate (M.P. 206–208° C.) (vac.), a hydrochloride (M.P. 199–201° C.) (vac.) and an oxalate (M.P. 216–218° C.) (vac.).

The pharmacological action of rescinnamine is marked by pronounced hypotensive and sedative activity and is similar to that of reserpine.

Any of the methods used to prepare an extract high in sedative activity from the plant, such as those which we are making the subject of another patent application, may be used to prepare an extract containing the rescinnamine; the rescinnamine may then be isolated from this extract in various ways according to the solvent used.

Extracts of the plant which may be used for the isolation of rescinnamine are for example, an extract of the dried roots of Rauwolfia serpentina with an ammoniated organic solvent such as chloroform. This extract may then be purified by the process described in our co-pending application, Serial No. 361,076 filed June 11, 1953.

Another extract which may be used is the "oleoresin" obtainable from the plant by extraction with a lower alcohol, for example methanol, and purified by treatment with a lipoid solvent, such as petroleum ether, and then with water.

An extract obtainable from the plant by pre-wetting the root with water or a suitable dilute acid, such as acetic acid, and extracting with a non-polar solvent such as benzene or a halogenated hydrocarbon, preferably methyl chloroform, may also be employed.

There may be used also an extract which can be obtained by treating the plant with an aqueous acid agent, particularly an aqueous solution of a lower fatty acid, for example, formic acid, acetic acid, propionic acid, or a phosphoric acid or citric acid. The acid solution thus obtained can be concentrated to smaller volume or diluted with water. This solution is then extracted with a weakly polar or non-polar solvent which is only partially miscible with water, preferably with a halogenated hydrocarbon, such as chloroform, ethylene di-chloride, methylene chloride or trichloroethylene, or with benzene or ethyl acetate. The extract in the weakly polar or non-polar solvent thus obtained can be washed neutral and evaporated to dryness. From the residue, rescinnamine can be isolated, if necessary after preliminary removal of reserpine, according to the invention.

Isolation processes which may be employed are for instance (1) use of an adsorption agent, such as silicic acid, or preferably alumina; (2) distribution between a polar solvent and a weakly polar or nonpolar solvent partially miscible with water; (3) crystallization from methanol solution; if necessary, after prior crystallization of the reserpine present or (4) crystallization from benzene solution, or a combination of any of these procedures.

As a weakly polar or nonpolar solvent which is only partially miscible with water, there is used preferably a halogenated hydrocarbon, such as chloroform, ethylene chloride, or methylene chloride or trichloro-ethylene, benzene or ethyl acetate or mixtures thereof.

Polar solvents are, for instance, alcohols, such as methanol, ethanol or higher aliphatic alcohols, water or dilute aqueous solutions of suitable inorganic or organic acids.

The following examples illustrate methods of carrying out the present invention.

*Example 1*

Approximately 5 kilograms of dried ground root of *Rauwolfia serpentina* was extracted during four operations with a total of 34 liters of 0.4 N chloroform-ammonia solution. The above solution contained about 2% of a mixture of wetting agents such as 50% sorbitan monooleate (Span 80) and 50% polyoxyethylene stearate (Myrj 45), in order to increase the extraction of the alkaloids to a maximum. The above solution when concentrated under vacuum yielded 195 grams of extract containing total solids amounting to 3.7% of the root; such extract was dissolved in four liters of methanol. This methanol solution was then passed through a two-inch ion-exchange column about 17 inches long containing about 500 grams of a cation-exchange resin known to the trade as Amberlite IRC-50, on the hydrogen cycle. The rate of flow was 20 ml. per minute. Following passage of the solution through the column, the column was washed with four liters of methanol to remove any materials not fixed on the exchange material. The column was then eluted with 500 ml. of 0.2 N HCl-methanol solution, then with 500 ml. of 0.05 N HCl-methanol solution, and then with two liters of methanol. The methanol eluate off the column was acidic and was subsequently adjusted to a pH of approximately 5. The pH adjustment may be effected by any of the well-known means, e.g. titration with sodium hydroxide or ammonium hydroxide. We prefer to titrate with an anion-exchange resin on the —OH cycle such as the above mentioned synthetic resin known as Amberlite IR-A400. The resin was filtered off and washed with methanol. The combined eluants containing all of the alkaloidal constituents which had been absorbed on the column were evaporated to dryness under vacuum to yield an alkaloidal product amounting to 1.7 percent of the original dried root.

50 gm. of this alkaloidal mixture was dissolved in 85 ml. of methanol, and 3500 ml. of benzene were added slowly with stirring. The mixture was stirred for one hour at room temperature and the solution was then decanted from the insoluble tarry materials. The insoluble materials were treated again in this way with methanol and benzene, and the insoluble portion was rejected. The benzene-methanol extracts were combined and concentrated on the steam-table under vacuum to one-third of the original volume. The mixture was allowed to cool to room temperature and filtered. The residue was washed with 1 l. benzene. The filtrates were combined. The benzene solution was extracted twice with one-fifth its volume of 5% aqueous acetic acid and once with one-third the volume of water. The aqueous extracts were combined and washed with one-third the volume of benzene. The benzene extracts and wash were combined, evaporated to dryness under vacuum on the steam-table yielding a dark-brown amorphous resin. Yield 6.0 gm. approx.

This amorphous resin was dissolved in 70 ml. 3% glacial acetic acid-methanol and the solution then made basic with ammonium hydroxide and allowed to stand. The reserpine crystallizes out. The mother liquor is evaporated to dryness. Yield 4.5 gm. approx. This residue was dissolved in the minimum of benzene and chromatographed on an acid washed alumina column (150 gms.). The column is then first developed by washing with benzene and then further washed by a sequence of solvents benzene→chloroform→up to 1% methanol-chloroform in increments of 5% dilution with the more polar solvent. This results in eluting off the column, first an inactive oily material, followed by the fraction rich in rescinnamine. The fractions which give the characteristic color yellow-green to blue with Fröhde's reagent are then combined, dissolved in a minimum of hot benzene and allowed to stand. Rescinnamine crystallizes as fine needles. The material may then be recrystallized from dilute methanol or acetone if so desired. Yield 0.7 gm.

EXAMPLE 2

5 kg. of finely ground root of *Rauwolfia serpentina* Benth. were extracted twice with 70 litres of 5% aqueous acetic acid. The combined extracts were extracted with one-fourth the volume of chloroform, and chloroform was washed with 2.5 l. dilute sodium carbonate solution, and then evaporated to dryness under vacuum. Yield 23 gm. The solid residue was dissolved in 10 to 20 parts of 3% glacial acetic acid-methanol, the solution was made basic with ammonium hydroxide; on standing 3 gm. approx. of reserpine crystallized out. The mother liquor was evaporated to dryness in vacuum and the residue (20 gm. approx.) was distributed in countercurrent between equal portions (1 liter) of methylchloroform and 5% aqueous acetic acid in nine separating funnels numbered 0 through 8. The sedative material is concentrated in the center section (tubes 1–7).

The upper phases in tubes 1 through 7 are combined; the solution is basified with ammonium hydroxide and extracted twice with one-fourth the volume of chloroform.

The lower phases in tubes 1 through 7 are combined, washed once with one-fourth the volume of dilute sodium carbonate, and combined with the chloroform solution. The combined solution was evaporated to dryness and rescinnamine obtained by crystallization directly from benzene. Yield 1.0 gm. approx. Alternatively, the residue from the combined chloroform-methyl chloroform solution may be further purified, if necessary, by chromatography as described in Example 1, prior to crystallization from benzene.

EXAMPLE 3

5 kg. of ground, dried roots of *Rauwolfia canescens* Linn. were extracted with six 14.1 portions of 90% ethanol; the extractions were carried out in a stainless steel tank equipped with stirrer and drain. Each extraction was stirred for eight hours, drained through filter pads into glass stills, and concentrated at 100–200 mm. pressure to a viscous liquid. On completion of the last extract the combined concentrates were evaporated to dryness on the steam table at 100–200 mm. pressure, yielding a tan colored resin (585 gm.).

The resin obtained above was powdered and added with vigorous stirring to 2 l. of distilled water. After stirring for one-half hour the aqueous extract was decanted off and the remaining tarry material was further extracted several times with water. The dark brown water-insoluble material remaining was dried to a semi-solid mass in a vacuum desiccator, 76 gm. This was further exhaustively extracted with petrol ether and 60 gm. of a dark brown residue, the "oleoresin" was obtained. This material is triturated four times in each case with 2 l. of 5 to 10% aqueous acetic acid, and the combined extracts were extracted with one-fourth the volume of chloroform. The chloroform solution was then treated as in Example 2. Approximately 0.9 gm. of rescinnamine was obtained.

EXAMPLE 4

5 kg. of good dried *Rauwolfia serpentina* root is wetted with water (6.5 l.) and then extracted batch-wise three times with 70.1 portions of methyl chloroform. The methyl chloroform extracts are combined and evaporated to dryness in vacuum. Yield of solids 43 gm. The lipoid material is then removed by, for example, extraction with an aqueous base, or lipoid solvent, alternatively and preferably the alkaloid may be removed by absorption on a cation exchange resin as described in Example 1. Yield of dried alkaloids 15 gms. The alkaloids are dissolved in 250 ml. methanol and the solution basified with ammonium hydroxide. On standing reserpine crystallizes out. From the mother liquors remaining, rescinnamine may then be obtained by careful dilution with water to faint turbidity and allowing to stand. Preferably, however, the mother liquors are purified further by, for example, chromatography, as in Example 1. Yield of rescinnamine 1.2 gm.

From the rescinnamine obtained according to the processes of the invention, it is possible to prepare the salts, e.g. the sulfate, in the following manner:

200 mg. of rescinnamine was dissolved in 25 ml. of 5% acetic acid, 1 ml. of 30% ammonium sulfate solution was added. The precipitate was recovered by filtration and dried. Weight 160 mg. The material was crystallized from methanol-water forming clumps of needles, M.P. 206–208° C. (vac.).

In an analogous manner the hydrochloride, M.P. 199–201° C. (vac.), or salts of other mineral acids may be prepared.

The oxalate of rescinnamine may be prepared as follows: 200 mg. of rescinnamine was dissolved in 10 ml. acetone and 40 mg. of oxalic acid was added. Crystallization commenced almost immediately. The material was recrystallized from dilute acetone forming clumps of needles, M.P. 216–218° C., with preliminary sintering. Other salts of organic acids may be prepared in a similar manner.

It is possible to effect partial purification of a crude aqueous extract by precipitating reserpine and rescinnamine in the form of their salts by the addition of the appropriate anion.

Rescinnamine and its salts can be made up into pharmaceutical preparations for oral or parenteral administration in various dosage forms. For example, a tablet of the following composition can be made:

*"Rescamine" tablets—0.1 mg.*

| | |
|---|---|
| Rescinnamine _____ mg__ | 0.1 |
| Lactose _____ mg__ | 74.0 |
| Powdered sugar _____ mg__ | 73.9 |
| Corn starch _____ mg__ | 1.0 |
| Calcium stearate _____ mg__ | 1.0 |
| | 150.0 |

In making the tablets the lactose, powdered sugar and rescinnamine are mixed thoroughly and granulated with a paste of water and corn starch. The granules are dried, lubricated with calcium stearate and compressed into tablets.

It is to be understood that the foregoing examples are given by way of illustration and not of limitation. Modifications may be made in carrying out the invention without departing from the spirit and scope thereof, and we are to be limited only by the appended claims.

We claim as our invention:

1. A process for the preparation of the 3,4,5-trimethoxycinnamic ester of methyl reserpate substantially free from reserpine, which comprises extracting an aqueous acidic extract of a plant material of the Rauwolfia species with a substantially water-immiscible non-polar organic solvent, removing the organic solvent, dissolving the residue in aqueous acid, removing the major portion of the reserpine present from the resulting solution, removing the solvent, and finally crystallizing the 3,4,5-trimethoxycinnamic ester of methyl reserpate from a water-immiscible non-polar organic solvent.

2. A process for the preparation of the 3,4,5-trimethoxycinnamic ester of methyl reserpate substantially free from reserpine, which comprises extracting an aqueous acidic extract of a plant material of the Rauwolfia species with a substantially water-immiscible non-polar organic solvent, removing the organic solvent, dissolving the residue in an acetic acid-methanol mixture, removing the major portion of the reserpine present from the resulting solution, removing the solvent, and finally crystallizing the 3,4,5-trimethoxycinnamic ester of methyl reserpate from a water-immiscible non-polar organic solvent.

3. A process for the preparation of the 3,4,5-trimethoxycinnamic ester of methyl reserpate substantially free from reserpine, which comprises extracting an aqueous acidic extract of a plant material of the Rauwolfia species with a substantially water-immiscible non-polar organic solvent, removing the organic solvent, dissolving the residue in aqueous acid, removing the major portion of the reserpine present from the resulting solution by crystallization upon making the solution basic with an alkali, removing the solvent, and finally crystallizing the 3,4,5-trimethoxycinnamic ester of methyl reserpate from a water-immiscible non-polar organic solvent.

4. A process for the preparation of the 3,4,5-trimethoxycinnamic ester of methyl reserpate substantially free from reserpine, which comprises extracting an aqueous acidic extract of a plant material of the Rauwolfia species with a substantially water-immiscible non-polar organic solvent, removing the organic solvent, dissolving the residue in aqueous acid, removing the major portion of the reserpine present from the resulting solution by crystallization upon making the solution basic with ammonium hydroxide, removing the solvent, and finally crystallizing the 3,4,5-trimethoxycinnamic ester of methyl reserpate from a water-immiscible non-polar organic solvent.

5. A process for the preparation of the 3,4,5-trimethoxycinnamic ester of methyl reserpate substantially free from reserpine, which comprises extracting an aqueous acidic extract of a plant material of the Rauwolfia species with a substantially water-immiscible non-polar organic solvent, removing the organic solvent, dissolving the crude residue in aqueous acid, removing the major portion of the reserpine present from the resulting solution by precipitating it as the salt of an anion, and finally crystallizing the 3,4,5-trimethoxycinnamic ester of methyl reserpate from the residual solution.

6. A process for the preparation of the 3,4,5-trimethoxycinnamic ester of methyl reserpate substantially free from reserpine, which comprises extracting an aqueous acidic extract of a plant material of the Rauwolfia species with a substantially water-immiscible non-polar organic solvent, removing the organic solvent, dissolving the residue in aqueous acid, removing the major portion of the reserpine present from the resulting solution, removing the solvent, and finally recovering the 3,4,5-trimethoxycinnamic ester of methyl reserpate from the residue by solvent distribution between a substantially polar solvent and a substantially water-immiscible non-polar organic solvent.

7. A process for the preparation of the 3,4,5-trimethoxycinnamic ester of methyl reserpate substantially free free from reserpine, which comprises extracting an aqueous acidic extract of a plant material of the Rauwolfia species with a substantially water-immiscible non-polar organic solvent, removing the organic solvent, dissolving the residue in substantially polar organic solvent, precipitating the major portion of the reserpine present from the resulting solution by basicifying the solution and finally crystallizing the 3,4,5-trimethoxycinnamic ester of methyl reserpate from the residual solution by diluting with water.

8. A process for the preparation of the 3,4,5-trimethoxycinnamic ester of methyl reserpate substantially free from reserpine, which comprises extracting an aqueous acidic extract of a plant material of the Rauwolfia species with a substantially water-immiscible non-polar organic solvent, removing the organic solvent, dissolving the residue in aqueous acid, removing the major portion of the reserpine present from the resulting solution, and finally recovering the 3,4,5-trimethoxycinnamic ester of methyl reserpate by chromatographic adsorption.

9. A process for the preparation of the 3,4,5-trimethoxycinnamic ester of methyl reserpate substantially free from reserpine, which comprises extracting an aqueous acidic extract of a plant material of the Rauwolfia species with chloroform, evaporating the chloroform extract, dissolving the residue in a mixture of acetic acid and methanol, precipitating the major portion of the reserpine present from the resulting solution by adding sufficient ammonium hydroxide to make the solution basic, evaporating the residual solution, and finally recovering the 3,4,5-trimethoxycinnamic ester of methyl reserpate from the residue by crystallization from benzene.

10. A process for the production of the 3,4,5-trimethoxycinnamic ester of methyl reserpate substantially free from reserpine, which comprises extracting an aqueous acidic extract of a plant material of the Rauwolfia species with chloroform, evaporating the chloroform extract, dissolving the residue in a mixture of acetic acid and methanol, precipitating the major portion of the reserpine present from the resulting solution by adding sufficient ammonium hydroxide to make the solution basic, evaporating the residual solution, subjecting the residue to solvent distribution between methylchloroform and acetic acid, and finally recovering the 3,4,5-trimethoxycinnamic ester of methyl reserpate by crystallization from benzene.

11. In a process for obtaining an extract consisting of the weakly basic alkaloids of Rauwolfia plant material, the improvement which comprises wetting the pulverized Rauwolfia plant material under neutral conditions with a quantity of water substantially equal to the dry weight of the plant material and thereafter treating the so wetted material with benzene to obtain said extract containing the weakly basic alkaloids.

12. In a process for obtaining an extract consisting of the weakly basic alkaloids of Rauwolfia plant material, the improvement which comprises wetting the Rauwolfia plant material with water under conditions varying from neutral to dilutely acidic and thereafter treating the so wetted plant material with a non-polar organic solvent to obtain said extract containing the weakly basic alkaloids.

13. A process according to claim 12, wherein the non-polar solvent is a halogenated hydrocarbon.

14. A process according to claim 13, wherein the halogenated hydrocarbon is methyl chloroform.

15. A process for isolating the 3,4,5-trimethoxycinnamic ester of methyl reserpate from Rauwolfia plant material which comprises wetting the Rauwolfia plant material under neutral conditions with a quantity of water substantially equal to the dry weight of the plant material, treating the so wetted material with a non-polar organic solvent to obtain an extract of alkaloids, removing the solvent from the extract, dissolving the resulting dry residue in methanol and separating the reserpine therefrom by crystallizing the reserpine and removing it from the mother liquors, recovering the 3,4,5-trimethoxycinnamic ester of methyl reserpate from the mother liquors by dilution with water, thereby causing said ester to precipitate.

16. A process for isolating the 3,4,5-trimethoxycinnamic ester of methyl reserpate from Rauwolfia plant material which comprises wetting the Rauwolfia plant material under neutral conditions with a quantity of water substantially equal to the dry weight of the plant material, treating the so wetted material with a non-polar organic solvent to obtain an extract of alkaloids, removing the solvent from the extract, dissolving the resulting dry residue in methanol and separating the reserpine therefrom by crystallizing the reserpine and removing it from the mother liquors, removing the solvent from the mother liquors and recovering the 3,4,5-trimethoxycinnamic ester of methyl reserpate from the resulting residue by recrystallizing it from benzene.

17. A process for producing the 3,4,5-trimethoxycinnamic ester of methyl reserpate which comprises contacting Rauwolfia plant material with a dilute aqueous acid solution to produce an aqueous solution containing the weakly basic alkaloids, contacting the resulting solution with a substantially water-immiscible, non-polar solvent to form an extract of the weakly basic alkaloids in the non-polar solvent, removing the non-polar solvent from the extract, treating the resultant residue with a lower alkanolic solvent to obtain an alkaloidal solution, crystallizing the reserpine therefrom and separating the crystals from the mother liquor, removing the solvent from the mother liquor to produce a residue, and recovering the 3,4,5-trimethoxycinnamic ester of methylreserpate from the residue.

References Cited in the file of this patent

UNITED STATES PATENTS 2,752,351     Schlittler _____ June 26, 1956

OTHER REFERENCES

Djerassi et al.: JACS, vol. 75, pp. 5446–5447 (effective date Oct. 4, 1953).

Bader et al.: JACS, vol. 76, pp. 1695–1696 (effective date Jan. 11, 1954).

Haack et al.: Die Naturwissenschaften, vol. 41 (1954), pp. 214–215.

Gupta et al.: Ind. J. Med. Research, vol. 32, pp. 183–188 (1944), as abstracted in Chem. Abstracts, vol. 40, col. 4148 (1946).

Schroff et al.: Ind. J. Pharm., vol. 3, pp. 59–61 (1941), as abstracted in Chem. Abstracts, vol. 35, cols. 6392–6393 (1941).

UNITED STATES PATENT OFFICE
CERTIFICATION OF CORRECTION

Patent No. 2,974,144                      March 7, 1961

Murle W. Klohs et al.

It is hereby certified that error appears in the above numbered patent requiring correction and that the said Letters Patent should read as corrected below.

Column 1, lines 29 and 30, for "Serial No. 3,610,076" read -- Serial No. 361,076 --; same column, line 30, for "abadoned" read -- abandoned --; line 37, for "any" read -- and --; column 2, line 4, for "$C_{35}H_{42}O_9N_2$%" read -- $C_{35}H_{42}O_9N_2$ --; column 3, line 47, after "of" strike out "a".

Signed and sealed this 15th day of August 1961.

(SEAL)
Attest:

ERNEST W. SWIDER
Attesting Officer

DAVID L. LADD
Commissioner of Patents